United States Patent Office 3,396,385
Patented Aug. 6, 1968

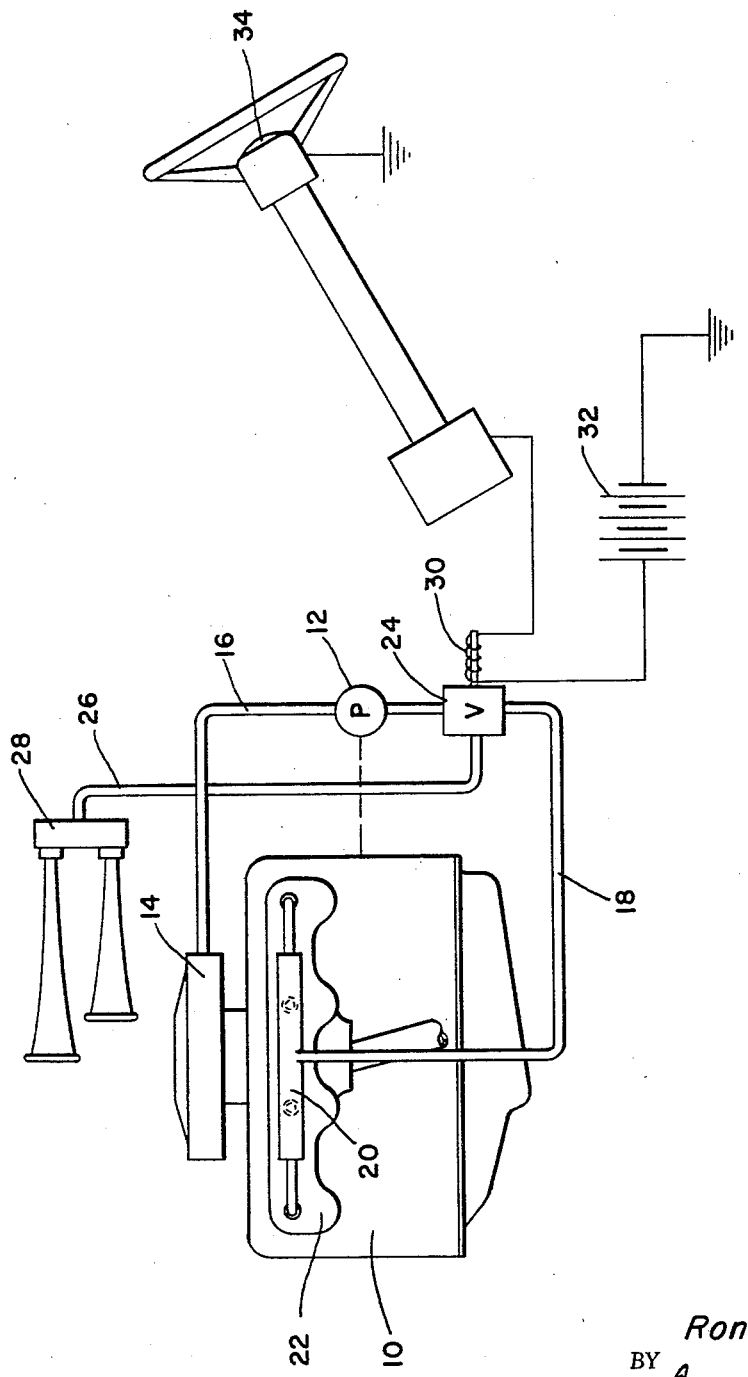

3,396,385
AIR OPERATED HORN RECEIVING AIR SUPPLY FROM EXHAUST EMISSION CONTROL LINE
Ronald C. Treloar, Saginaw, Mich., assignor to General Motors Corporation, Detroit, Mich., a corporation of Delaware
Filed July 26, 1965, Ser. No. 474,862
3 Claims. (Cl. 340—404)

ABSTRACT OF THE DISCLOSURE

A system for the operation of the air horn of a motor vehicle is disclosed. A pump supplies air under pressure from the air cleaner to the exhaust manifold. A portion of this air may be selectively routed by solenoid operated valve apparatus to the air horn.

---

This invention relates to vehicle warning systems and more particularly to air operated horns therefor.

Horns that are air operated have certain advantages in construction and operability over electrically operated horns and, therefore, are desirable for use in motor vehicles. Air operated horns require fluid under pressure of a predetermined magnitude for proper operation and, therefore, have not found wide usage in motor vehicles except of the heavy duty or commercial variety. Normally, heavy duty or commercial vehicles have positive air pressure producing systems for other uses, such as brakes, and, therefore, it is relatively easy to tap some of this pressure for the operation of horns. Passenger automobiles and smaller commercial vehicles normally do not have positive air pressure producing systems and, therefore, air operated horns are infrequently used.

Recent emphasis placed on excessive hydrocarbon emission from vehicles has caused a great amount of research to be done in this area, An effective way of reducing the unburned hydrocarbon content of exhaust gases from motor vehicles is to bring about more complete combustion of the combustible mixture. One method proposed to carry out this goal is to inject air under pressure into an area immediately adjacent to the exhaust valves of a motor vehicle in order to promote complete combustion resulting in an exhausted residue primarily composed of carbon dioxide and water rather than carbon monoxide and hydrocarbons. When such an installation is had on a vehicle engine, an engine driven pump is used to create a positive air pressure to promote combustion and flush the exhaust manifold. With the incorporation of a positive air pressure pump into an automobile accessory group, a means is provided for supplying pressured air to a single or multiple horn arrangement.

It is an object of the present invention to combine a fluid pressure responsive vehicle warning system with an oxidation type emission control system.

It is another object of the present invention to provide an improved vehicle warning system at very little cost.

It is still another object of the present invention to provide other essential uses for a positive pressure pump that must be installed on a vehicle engine to carry out a separate function.

It is a further object of the present invention to provide an improved maintenance free, solenoid operated air valve which taps a predetermined amount of an air pump pressure output to operate air horns.

Further objects and advantages of the present invention will be apparent from the following description, reference being had to the accompanying drawing wherein a preferred embodiment of the present invention is clearly shown.

In the single figure drawing, a diagrammatic illustration of the combination of a vehicle warning system and an oxidation type emission control system is illustrated.

Referring to the drawing, a vehicle engine 10 is operatively connected to an air pump 12 which can be of many well-known types, such as a semi-articulated vane type pump. Pump 12 draws filtered air from air cleaner 14 through line 16 and normally drives this air under a predetermined pressure through line 18 into a manifold 20 which routes the air under pressure to predetermined points in an exhaust manifold 22 of engine 10.

As previously explained, the oxygen content of the exhaust manifold is increased resulting in more complete combustion of the exhausted mixture from the engine and, consequently, a much lower hydrocarbon content at the exhaust.

A solenoid operated air valve 24 is provided in line 18 and selectively routes air under pressure through line 26 to air horns 28. Air valve 24 responds to solenoid 30 which is selectively grounded through battery 32 by horn button 34.

In operation, when engine 10 is operating, pump 12 is providing a positive air pressure in line 18. When the vehicle operator desires to warn persons exterior of the vehicle of the impending passage of the vehicle, pressure is put on horn button 34 completing a circuit to solenoid 30. Solenoid 30 immediately shifts valve 24 to route a predetermined pressure through line 26 to air horn 28. Air horn 28 provides an audible sound to warn persons exterior of the vehicle of the impending passage thereof.

The subject system finds particular utility in substituting for a much more expensive and more sophisticated electrically operated vehicle horn. The present invention provides a very simple electrically operated solenoid which merely vents an amount of air under pressure from a pump outlet to an air operated horn. Both air operated horns of common design and electrically operated horns are much more intricate in nature and, consequently, this invention represents a substantial advance in the art. It is obvious that any number of air horns can be provided as well as varying the tone thereof to provide a more pleasing but more effective method of warning persons of the impending passage of a motor vehicle.

The subject invention has the added utility of being readily adaptable for use on motor vehicles already equipped with an oxidation type emission control system and represents relatively little added cost. The conventional horn operating means can be utilized, thereby causing a minimum of confusion to vehicle operators not familiar with air operated horns normally used on heavy duty commercial vehicles. Additionally, when pump 12 is not operating, a very small amount of residual pressure remains in line 18, thereby avoiding prolonged horn operation common to motor vehicles when a horn relay sticks in the actuated position. It would also be possible to readily connect the horn button through an ignition switch adapting the subject invention to be immediately deenergized upon a malfunctioning in the electrical control system.

While the embodiment of the present invention, as herein disclosed, constitutes a preferred form, it is to be understood that other forms might be adopted.

What is claimed is as follows:

1. In combination, a motor vehicle emission control system having a positive pressure source, and a vehicle warning system, said warning system comprising: inlet means from a carburetor air cleaner of said vehicle emission control system; electrically controlled valve means for selectively communicating fluid to said inlet means from said vehicle emission control system while maintaining fluid pressure in said motor vehicle emission control system; and sound producing means in fluid communication with said valve means and responding to the selective communication of fluid from said valve means for creating an audible sound.

2. The combination according to claim 1 wherein said motor vehicle emission control sytem is the manifold oxidation type having a fluid pump with an output of sufficient magnitude to operate air horns.

3. The combination according to claim 1 wherein said inlet means communicates filtered air from the carburetor air cleaner to an input of a fluid pump and said valve means is electrically operable to route filtered air under pressure from said pump to air horn means for audible sound production.

References Cited
UNITED STATES PATENTS

| | | | |
|---|---|---|---|
| 2,012,818 | 8/1935 | Hueber et al. | 340—404 |
| 2,610,235 | 9/1952 | Stella | 340—406 |
| 2,675,828 | 4/1954 | Booth | 251—129 X |

JOHN W. CALDWELL, *Primary Examiner.*

H. I. PITTS, *Assistant Examiner.*